US010648686B2

(12) United States Patent
Gillette et al.

(10) Patent No.: US 10,648,686 B2
(45) Date of Patent: May 12, 2020

(54) HVAC HIGH VOLTAGE POWERLINE COMMUNICATION SYSTEMS AND METHODS

(71) Applicant: Johnson Controls Technology Company, Auburn Hills, MI (US)

(72) Inventors: Theresa N. Gillette, Wichita, KS (US); Tyler P. McCune, El Dorado, KS (US); Jonathan A. Burns, Wichita, KS (US); Brian D. Rigg, Douglass, KS (US); Shawn A. Hern, Park City, KS (US); Tom R. Tasker, Andover, KS (US); Andrew M. Boyd, Wichita, KS (US); Cody J. Kaiser, Wichita, KS (US); Noel A. Grajeda-Trevizo, Newton, KS (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 7 days.

(21) Appl. No.: 15/988,795

(22) Filed: May 24, 2018

(65) Prior Publication Data

US 2019/0353368 A1 Nov. 21, 2019

Related U.S. Application Data

(60) Provisional application No. 62/671,799, filed on May 15, 2018.

(51) Int. Cl.
*F24F 11/30* (2018.01)
*H02J 13/00* (2006.01)
(Continued)

(52) U.S. Cl.
CPC .............. *F24F 11/30* (2018.01); *F24F 11/52* (2018.01); *F24F 11/56* (2018.01); *F24F 11/64* (2018.01);
(Continued)

(58) Field of Classification Search
CPC .. F24F 11/30; F24F 11/64; F24F 11/88; F24F 11/65; F24F 11/56; F24F 11/006; F24F 11/52; G05B 15/02; H02J 13/0017
(Continued)

(56) References Cited

U.S. PATENT DOCUMENTS 6,134,134 A   10/2000 Dushane et al.
6,211,782 B1   4/2001 Sandelman et al.
(Continued)

FOREIGN PATENT DOCUMENTS

EP   2487803 A1   8/2012
EP   1681776 B1   6/2013
(Continued)

*Primary Examiner* — Rocio Del Mar Perez-Velez
*Assistant Examiner* — Alicia M. Choi
(74) *Attorney, Agent, or Firm* — Fletcher Yoder, P.C.

(57) ABSTRACT

The present disclosure includes a heating, ventilation, and air conditioning (HVAC) system having a control system suitable to control operation of a device in the HVAC system. The control system may include a zone control panel that may control operation of the device using power-line communication. Accordingly, the zone control panel and the device may be both communicatively and electrically coupled via one or more power lines. To that end, the zone control panel may determine a primary address identifying the device and/or a secondary address indicating the one or more power lines electrically coupled to the device. Further, the zone control panel may communicate with and/or coordinate operation of the device by transmitting data messages
(Continued)

to the device via the one or more power lines based on the primary address and/or the secondary address.

19 Claims, 10 Drawing Sheets

(51) Int. Cl.
*G05B 15/02* (2006.01)
*F24F 11/88* (2018.01)
*F24F 11/56* (2018.01)
*F24F 11/64* (2018.01)
*F24F 11/65* (2018.01)
*F24F 11/52* (2018.01)

(52) U.S. Cl.
CPC .............. *F24F 11/65* (2018.01); *F24F 11/88* (2018.01); *G05B 15/02* (2013.01); *H02J 13/0017* (2013.01)

(58) Field of Classification Search
USPC .......................................................... 700/276
See application file for complete search history.

(56) References Cited

U.S. PATENT DOCUMENTS

| | | |
|---|---|---|
| 6,290,141 B1 | 9/2001 | Park et al. |
| 6,566,768 B2 | 5/2003 | Zimmerman et al. |
| 7,537,172 B2 | 5/2009 | Rossi et al. |
| 9,217,578 B2 | 12/2015 | Jo et al. |
| 9,507,353 B2 | 11/2016 | Xia et al. |
| 2006/0017324 A1* | 1/2006 | Pace ........................ H04B 3/54 307/3 |
| 2007/0131784 A1* | 6/2007 | Garozzo .................. F24F 11/30 236/51 |
| 2009/0009521 A1 | 1/2009 | Joeng et al. |
| 2009/0261174 A1* | 10/2009 | Butler ...................... F24F 11/30 236/51 |
| 2011/0006887 A1 | 1/2011 | Shaull et al. |
| 2011/0054700 A1 | 3/2011 | Chan et al. |
| 2013/0258538 A1* | 10/2013 | Billingsley ............ H02H 3/207 361/90 |
| 2013/0298575 A1 | 11/2013 | Stark et al. |
| 2014/0088780 A1* | 3/2014 | Chen ........................ G05F 1/66 700/295 |
| 2014/0265880 A1* | 9/2014 | Taipale ............... H05B 37/0263 315/158 |
| 2014/0333324 A1* | 11/2014 | Kabler ............... G01R 31/2836 324/537 |
| 2015/0081108 A1 | 3/2015 | Toriyama et al. |
| 2015/0280784 A1* | 10/2015 | Fornage ................. H04B 3/544 375/257 |
| 2016/0111878 A1* | 4/2016 | Qureshi ................. H04R 27/00 307/39 |
| 2016/0285309 A1* | 9/2016 | Draaijer ............... H02J 13/0003 |
| 2018/0145844 A1* | 5/2018 | Pera ...................... H04M 1/72533 |
| 2019/0353372 A1* | 11/2019 | Rigg ........................ F24F 11/61 |

FOREIGN PATENT DOCUMENTS

| | | |
|---|---|---|
| EP | 3141833 A1 | 3/2017 |
| KR | 2010048735 A | 5/2010 |
| WO | 2005047990 A2 | 5/2005 |
| WO | 2016100474 A1 | 6/2016 |

\* cited by examiner

HVAC HIGH VOLTAGE POWERLINE COMMUNICATION SYSTEMS AND METHODS

CROSS-REFERENCE TO RELATED APPLICATIONS

This application is a Non-Provisional Patent Application of U.S. Provisional Patent Application No. 62/671,799, entitled "HVAC High Voltage Powerline Communication Systems and Methods", filed May 15, 2018, which is herein incorporated in its entirety for all purposes.

BACKGROUND

The present disclosure generally relates to heating, ventilation, and air conditioning (HVAC) systems and, more particularly, a control system that may be implemented in a HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An HVAC system generally includes a control system to control and/or to coordinate operation of devices, such as equipment, machines, and sensors. For example, the control system may communicate sensor data and/or control commands with devices in the HVAC system. The control system may include a zone control panel or board, which may be communicatively coupled to one or more of the devices, for example, via dedicated one or more dedicated communication busses. However, at least in some instances, implementing a zone control panel to communicate over one or more dedicated communication buses may limit implementation or configuration flexibility, for example, when devices are added to the HVAC system. Accordingly, as the number of devices and/or complexity of the HVAC system increases, maintaining communication between devices may become increasingly cumbersome and/or resource intensive.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and air conditioning (HVAC) system includes a first device electrically coupled to a first power line that conducts a first phase of electrical power, a second power line that conducts a second phase of electrical power, or both. The system also includes a zone control panel electrically coupled to the first power line and the second power line. The zone control panel includes modulator circuitry and a microcontroller. The microcontroller is programmed to, when a first control command is to be communicated to the first device to instruct the first device to adjust operation, determine an address mapping. The address mapping associates each of a plurality of devices implemented in the HVAC system to a corresponding primary address and a corresponding secondary address, where a primary address is used to identify a corresponding device and where a secondary address indicates one or more power lines to which the corresponding device is electrically coupled. The microcontroller is further programmed to, when a first control command is to be communicated to the first device to instruct the first device to adjust operation, determine a first primary address and a first secondary address associated with the first device based at least in part on the address mapping and to generate a first data message that indicates the first control command and the first primary address associated with the first device. Further, the microcontroller is programmed to instruct the modulator circuitry to modulate voltage of the first phase of electrical power conducted by the first power line based on the first data message to enable supplying the first control command to the first device along with the first phase of electrical power when the first secondary address indicates that the first device is electrically coupled to the first power line.

In another embodiment, a method may be used to control operation of an HVAC system. The method involves determining, using a controller in the HVAC system, an address mapping that associates each of a plurality of devices implemented in the HVAC system to a corresponding primary address and a corresponding secondary address, where primary address is used to identify a corresponding device and where a secondary address indicates one or more power lines to which the corresponding device is electrically coupled. The method further involves determining, using the controller, a first primary address and a first secondary address associated with a first device based at least in part on the address mapping, where the first device is coupled to a first power line that conducts a first phase of electrical power, a second power line that conducts a second phase of electrical power, or both. The method further involves generating, using the controller, a data message that indicates a control command and the first primary address associated with the first device, where the control command is to be communicated to the first device to instruct the device to adjust operation. Further, the method involves instructing, using the controller, modulator circuitry in the HVAC system to modulate voltage of the first phase of electrical power conducted by the first power line based on the data message to enable supplying the control command to the first device along with the first phase of electrical power when the first secondary address indicates that the first device is electrically coupled to the first power line.

In another embodiment, a tangible, non-transitory, machine-readable medium, including machine-readable instructions executable by one or more processors implemented in an HVAC system that, when executed, cause the one or more processors to determine an address mapping that associates each of a plurality of devices implemented in the HVAC system to a corresponding primary address and a corresponding secondary address, where a primary address is used to identify a corresponding device and where a secondary address indicates one or more power lines to which the corresponding device is electrically coupled. The instructions, when executed, further cause the one or more processors to determine a first primary address and a first secondary address associated with a first device in the HVAC system based at least in part on the address mapping, where the first device is configured to be electrically coupled to a first power line that conducts a first phase of electrical power, a second power line that conducts a second phase of electrical power, or both. Further, when executed, the instructions cause the one or more processors to generate a first data message that indicates the first control command and the first primary address associated with the first device, where the first control command is to be communicated to the first device to instruct the device to adjust operation. Additionally, the instructions, when executed, cause the one or more processors to instruct modulator circuitry in the HVAC system to modulate voltage of the first phase of electrical power conducted by the first power line based on the first data message to enable supplying the first control command to the first device along with the first phase of electrical power when the first secondary address indicates that the first device is electrically coupled to the first power line.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
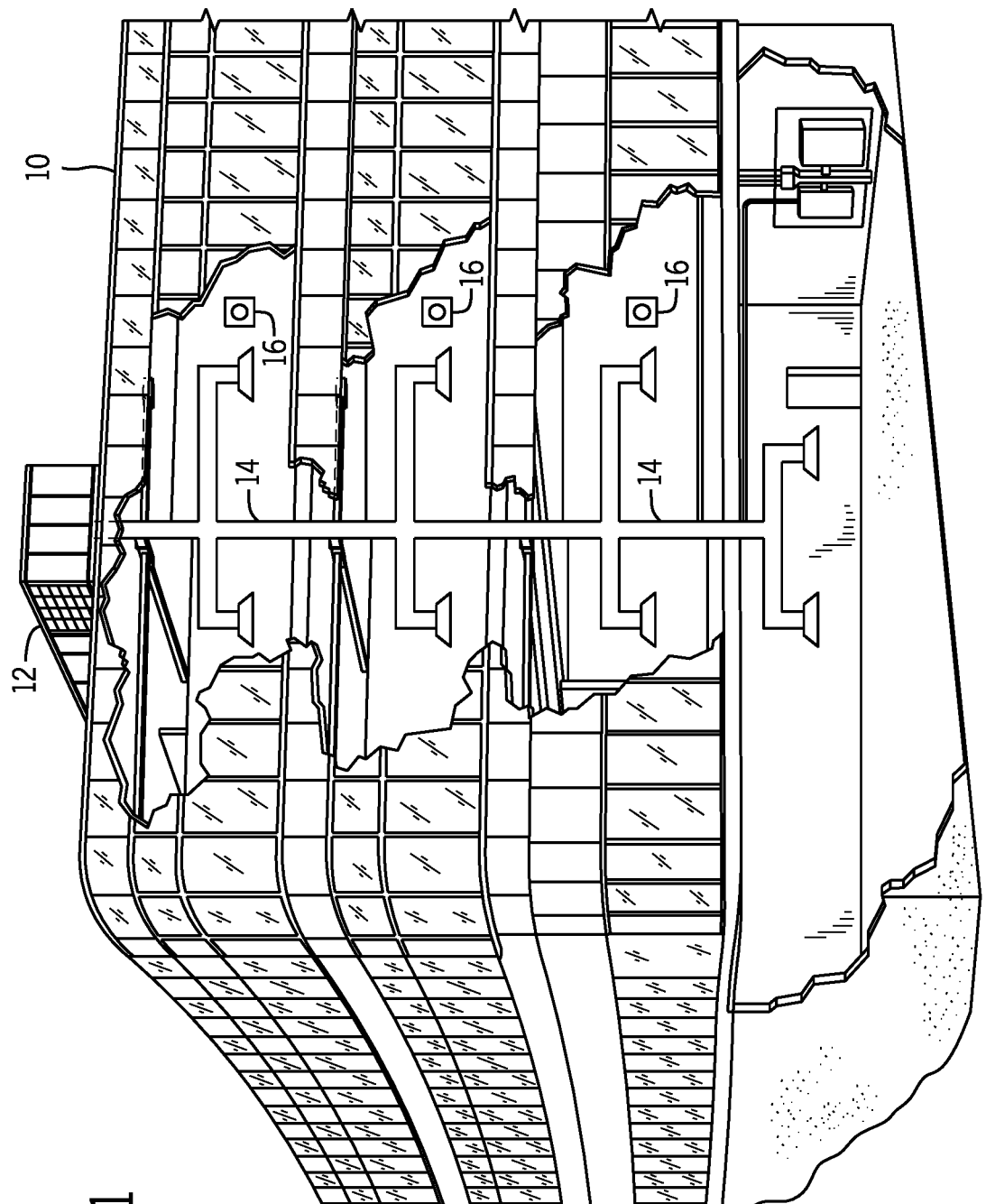
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often utilize a control system to control the operation of devices or equipment within the HVAC system. The control system may be implemented via one or more zone control panels or panels. That is, a zone control panel may receive input data or signals from one or more devices in the HVAC system, such as an interface device, a thermostat, a sensor, another zone control panel, or any combination thereof. Additionally or alternatively, a zone control panel may output control commands or signals that instruct one or more other devices in the HVAC system to perform control actions. For example, a zone control panel may receive a temperature setpoint via a thermostat, compare the temperature setpoint to a temperature measurement received from a sensor, and instruct equipment in the HVAC system to adjust operation when the temperature measurement deviates from the temperature setpoint by more than a threshold amount.

Each of the devices in the HVAC system may be electrically coupled to one or both of a first power line and a second power line in order to receive electrical power. For example, the first power line may supply first high-voltage alternating current (AC) power and the second power line may supply second high-voltage AC power, which is one-hundred eighty degrees out of phase relative to the first high-voltage AC power. Additionally, the zone control panel may be electrically coupled to both the first power line and the second power line. Since a device in the HVAC system is also electrically to at least one of the first power line and the second power line, the zone control panel may communicate data via the first power line and/or the second power line, for example, by modulating a data signal on the first high-voltage AC power and/or the second high-voltage AC power. In other words, to control operation of the devices in the HVAC system, the zone control panel may communicate to each of the devices using power-line communication (PLC) on one or both of the first power line or the second power line.

Accordingly, the present disclosure provides techniques to facilitate increasing operational flexibility and/or provide increased configuration options for an HVAC system. For example, controlling operation of devices and/or equipment in the HVAC system using power-line communication may facilitate reducing the number of dedicated communication busses implemented in the HVAC system. That is, the zone control panel and the device may be both electrically and communicatively coupled via a power line or bus, for example, obviating implementation of a dedicated communication bus between the zone control panel and the device. Thus, at least in some instances, the process of integrating a new device with the HVAC system may be simplified, for example, because electrically coupling the new device to the power bus also communicatively couples the device to the zone control panel and/or other devices in the HVAC system.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, then HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
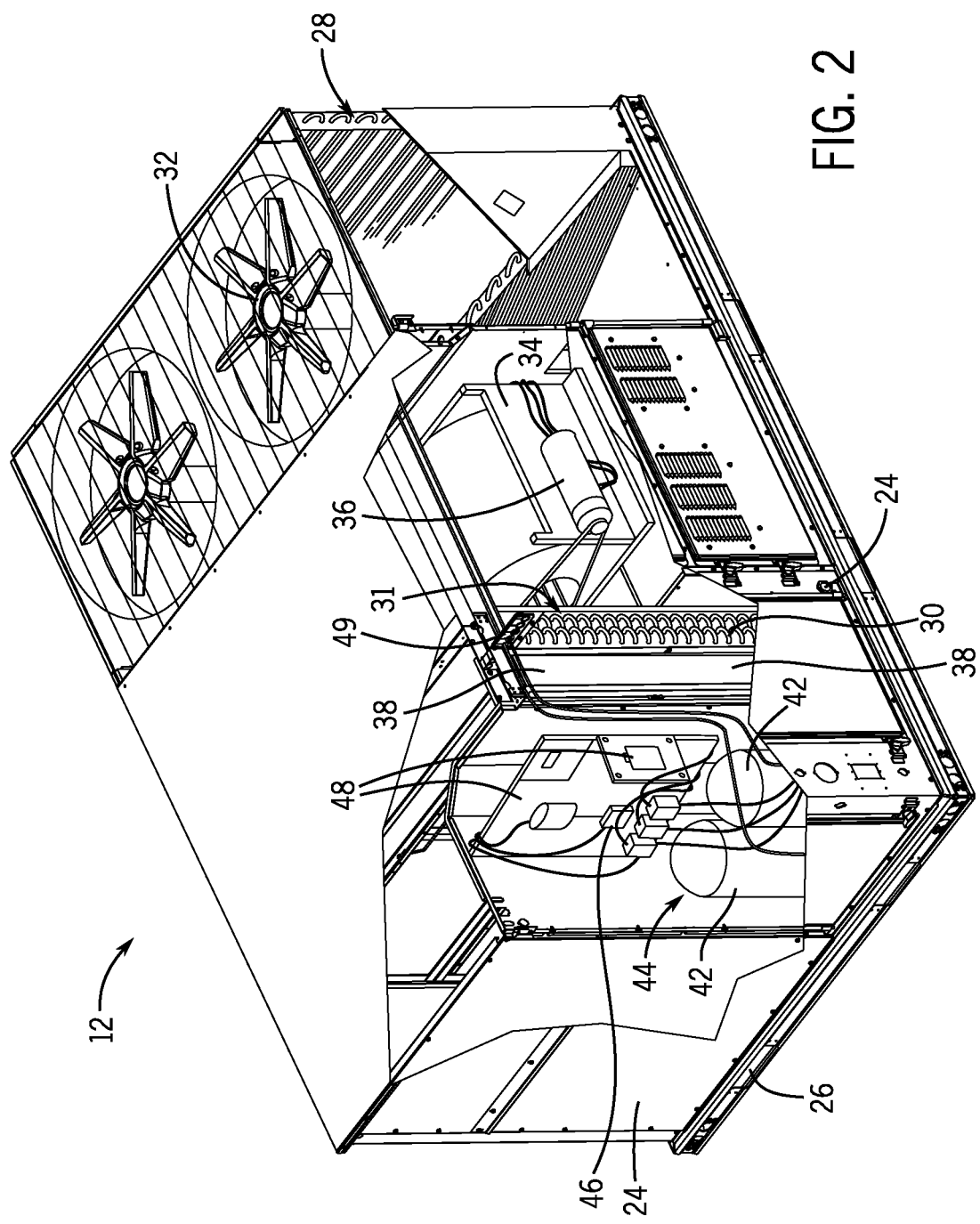
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and may provide structural support and/or protection to the internal components from environmental and/or other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements, such as rain, from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream.

In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 may draw air from the environment through the heat exchanger 28. Air may be heated and/or cooled as the air flows through the heat exchanger 28 before being released back to the environment surrounding the rooftop unit 12. A blower assembly 34, powered by a motor 36, may draw air through the heat exchanger 30 to heat or cool the air. The heated or cooled air may be directed to the building 10 by the ductwork 14, which may be connected to the HVAC unit 12. Before flowing through the heat exchanger 30, the conditioned air may flow through one or more filters 38 that may remove particulates and/or other contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 may increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
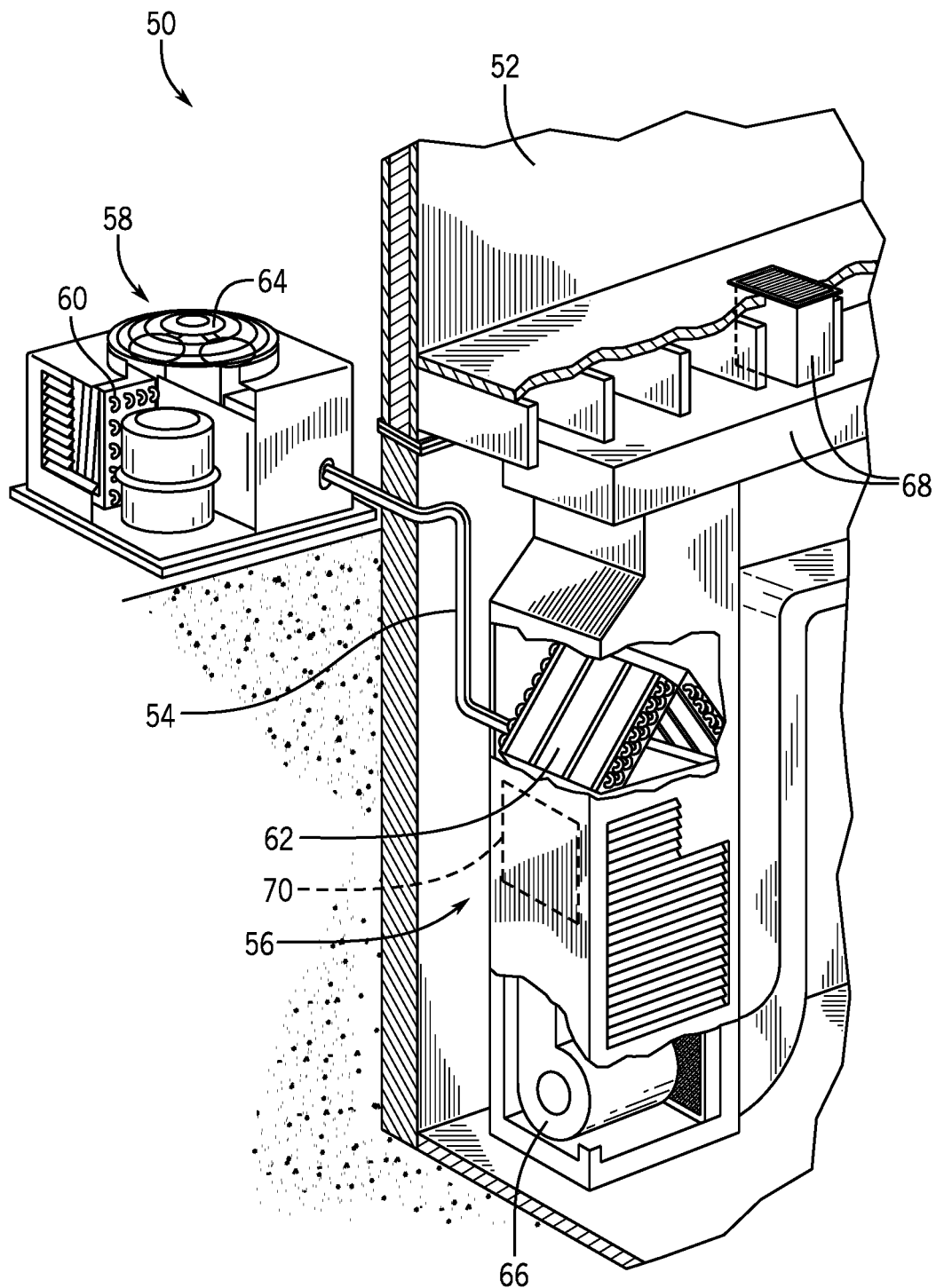
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor HVAC unit 56 to the outdoor HVAC unit 58. The indoor HVAC unit 56 may be positioned in a utility room, an attic, a basement, and/or the like. The outdoor HVAC unit 58 is typically situated adjacent to a side of residence 52 and is covered by a shroud to protect the system components and to reduce likelihood of leaves and/or other debris or contaminants from entering the unit. The refrigerant conduits 54 may transfer refrigerant between the indoor HVAC unit 56 and the outdoor HVAC unit 58, typically transferring primarily liquid refrigerant in one direction and primarily vaporized refrigerant in an opposite direction.

When the system shown in FIG. 3 is operating as an air conditioner, a heat exchanger 60 in the outdoor HVAC unit 58 may serve as a condenser for re-condensing vaporized refrigerant flowing from the indoor HVAC unit 56 to the outdoor HVAC unit 58 via one of the refrigerant conduits 54. In these applications, a heat exchanger 62 of the indoor unit may function as an evaporator. Specifically, the heat exchanger 62 receives liquid refrigerant, which may be expanded by an expansion device, and evaporates the refrigerant before returning it to the outdoor HVAC unit 58.

The outdoor HVAC unit 58 may draw environmental air through the heat exchanger 60 using a fan 64 and expel the air above the outdoor HVAC unit 58. When operating as an air conditioner, the air is heated by the heat exchanger 60 within the outdoor HVAC unit 58 exits the unit at a temperature higher than it entered. The indoor HVAC unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor HVAC unit 58 may serve as an evaporator to evaporate refrigerant, thereby cooling air entering the outdoor HVAC unit 58 as the air passes over outdoor the heat exchanger 60. The indoor heat exchanger 62 may receive a stream of air blown over it and heat the air by condensing the refrigerant.

In some embodiments, the indoor HVAC unit 56 may include a furnace system 70. For example, the indoor HVAC unit 56 may include the furnace system 70 when the residential heating and cooling system 50 is not implemented to operate as a heat pump. The furnace system 70 may include a burner assembly and heat exchanger, among other components, inside the indoor HVAC unit 56. Fuel may be provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
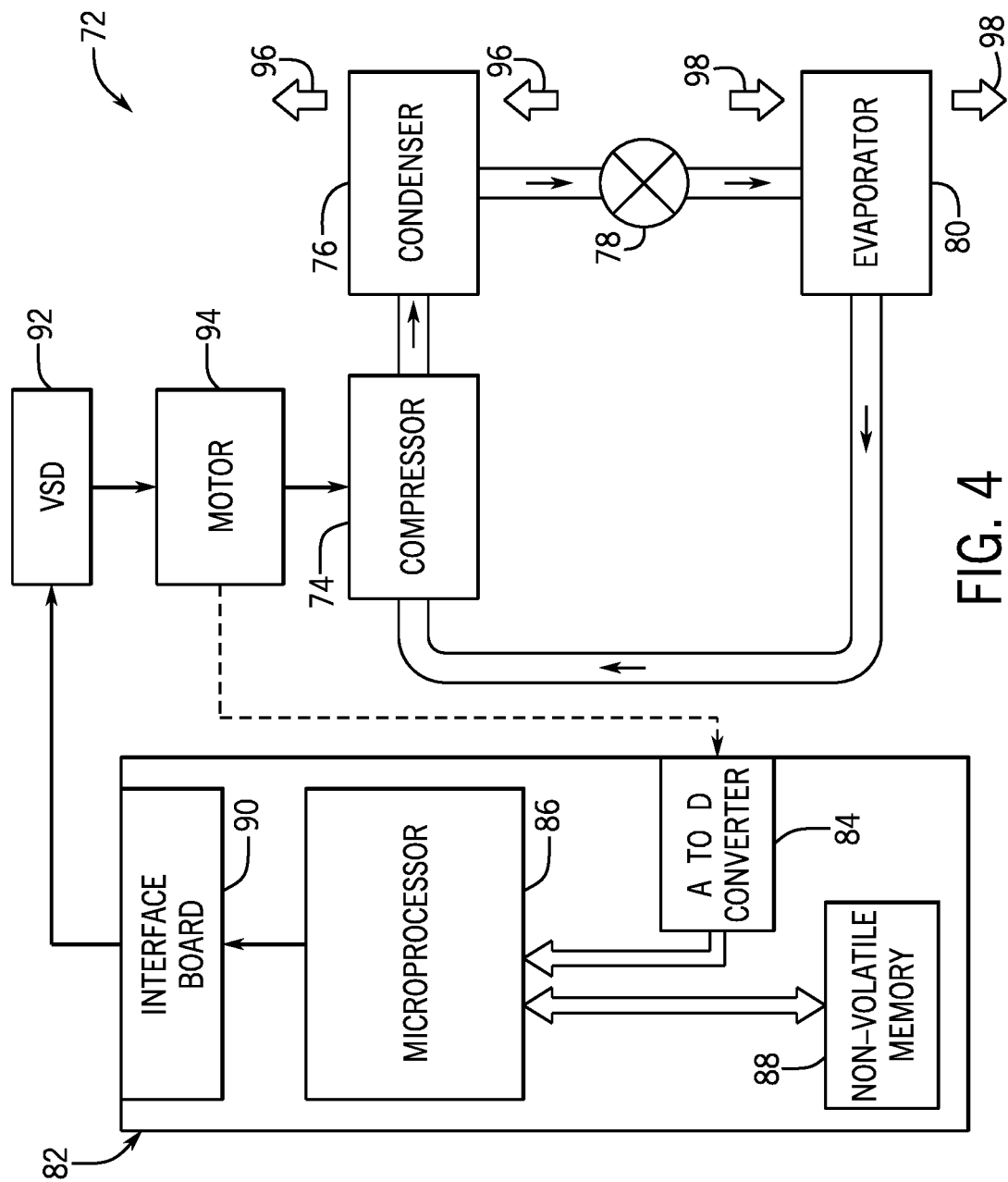
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, one or more expansion valves or devices 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. In some embodiments, the VSD 92 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. The techniques of the present disclosure may update features of the description above. In particular, as will be discussed in more detail below, a zone control panel may be implemented in the HVAC system, for example, to facilitate increasing operational flexibility and/or to provide increased configuration options of the HVAC system.

Figure 5:
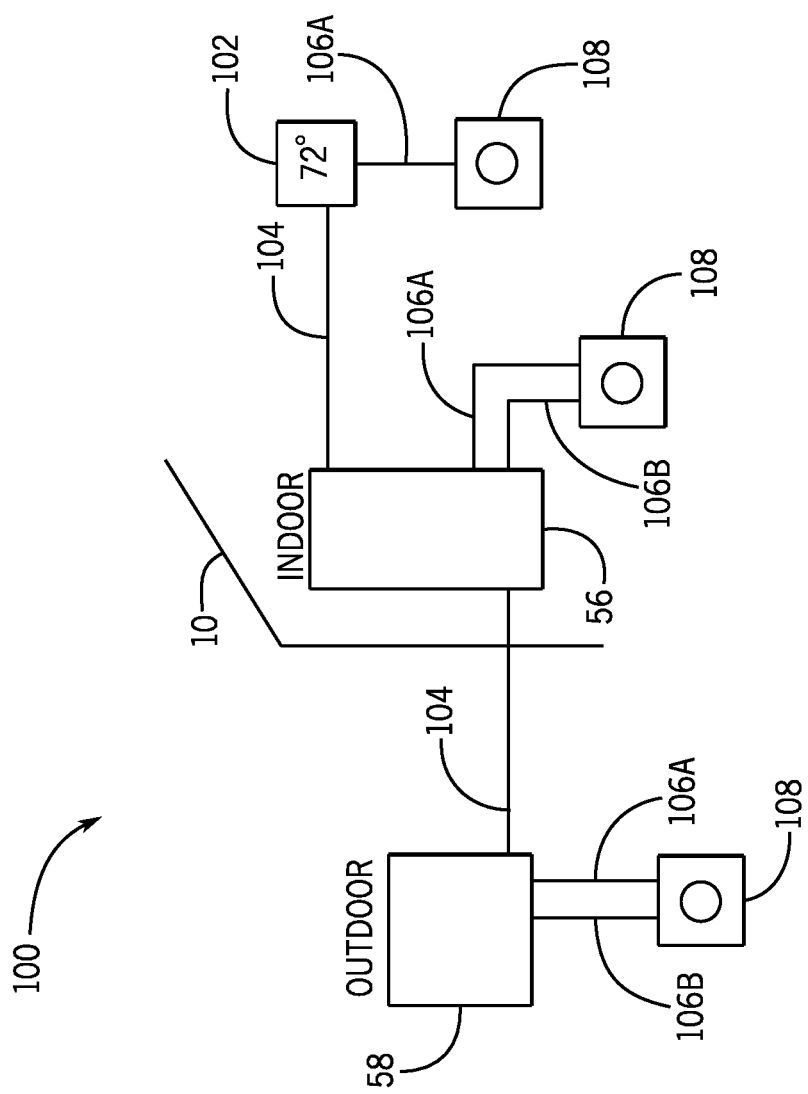
FIG. 5 is a schematic diagram of an HVAC system including one or more devices communicatively coupled via communication buses, in accordance with an embodiment of the present disclosure.

To help illustrate, an HVAC system 100 that includes multiple devices, such as an outdoor HVAC unit 58, an indoor HVAC unit 56, and/or an interface device 102, communicatively coupled via communication buses 104 or wiring is shown in FIG. 5. Using the communication buses 104, these devices may communicate information or data to one another according to one or more communication protocols, such as recommend standard 232 (RS-232) and/or recommended standard 585 (RS-585). That is, for example, the interface device 102, such as a thermostat, may use a communication protocol to transmit information related to a setpoint to the indoor HVAC unit 56 via a communication bus 104. After receiving the information from the communication bus 104, the indoor HVAC unit 56 may adjust its operation to provide air conditioned based at least in part on the setpoint.

To operate using electrical power, each of the devices may connect to one or more power lines 106 in the HVAC system 100. In some embodiments, the devices may be electrically coupled directly to the power lines 106 during installation, while in some embodiments, the devices may connect to the power lines 106, for example, via an electrical outlet 108. In any case, while the communication buses 104 conduct low-voltage alternating current (AC) power, such as 24 VAC, to transmit data, the power lines may conduct a high-voltage AC power, such as 120 VAC and/or 240 VAC to sufficiently power the devices. More specifically, in some embodiments a first power line 106A may provide a first high-voltage AC power with a first phase, such as 120 VAC, and a second power line 106B may supply a second high voltage AC power with a second phase, such as −120 VAC, which may be 180 degrees out of phase with the first phase.

In such embodiments, a first set of devices in the HVAC system 100, which may include an interface device 102 or thermostat, may receive electrical power via the first power line 106A. A second set of devices in the HVAC system 100, which may include an additional interface device 102, may receive electrical power via the second power line 106B. Further, a third set of devices in the HVAC system 100, which may include the indoor HVAC unit 56 and/or the outdoor HVAC unit 58, may receive electrical power via both the first power line 106A and the second power line 106B. Since the first phase may be one-hundred eighty degrees out of phase with the second phase, by receiving power via the first power line 106A and the second power line 106B, the third set of devices may receive a third high-voltage AC power with a maximum power equivalent to the difference between the first high-voltage AC power and the second high-voltage AC power, such as 240 VAC.

Further, in some embodiments, devices in the first set and/or the second set may include and/or be coupled to a transformer that operates to adjust voltage received from a respective power line, such as the first power line 106A or the second power line 106B. For example, to enable a thermostat to operate using 24 VAC, a transformer may to step 120 VAC power delivered on the first power line 106A down to 24 VAC before it is supplied to the thermostat.

In any case, to coordinate operation between a new device installed in the HVAC system 100 and existing devices in the HVAC system 100, the new device may be communicatively coupled to the existing devices, such as an indoor HVAC unit 56, an outdoor HVAC unit 58, and/or an interface device 102. Accordingly, one or more communication buses 104 may be implemented to communicatively couple the new device to one or more existing devices. As such, the installation of the new device may be limited by the number and/or location of communication buses 104 included in the HVAC system 100. For example, in an HVAC system 100 implemented in a building 10, a communication bus 104 may be routed through one or more walls of the building 10 and/or associated with a limited number of ports that enable communicatively coupling devices to the communication bus 104.

Accordingly, when an HVAC system 100 is constructed, it may be equipped with a suitable number of communication buses 104 and suitable routing of these communication buses 104 so that additional devices may be added to the HVAC system 100 in the future. Additionally or alternatively, new communication buses 104 may be routed into the HVAC system 100 to accommodate a new device. In either case, however, installing and/or maintaining the communication buses 104 may be cumbersome and/or may use significant resources, such as physical resources, time, and/or the like.

Figure 6:
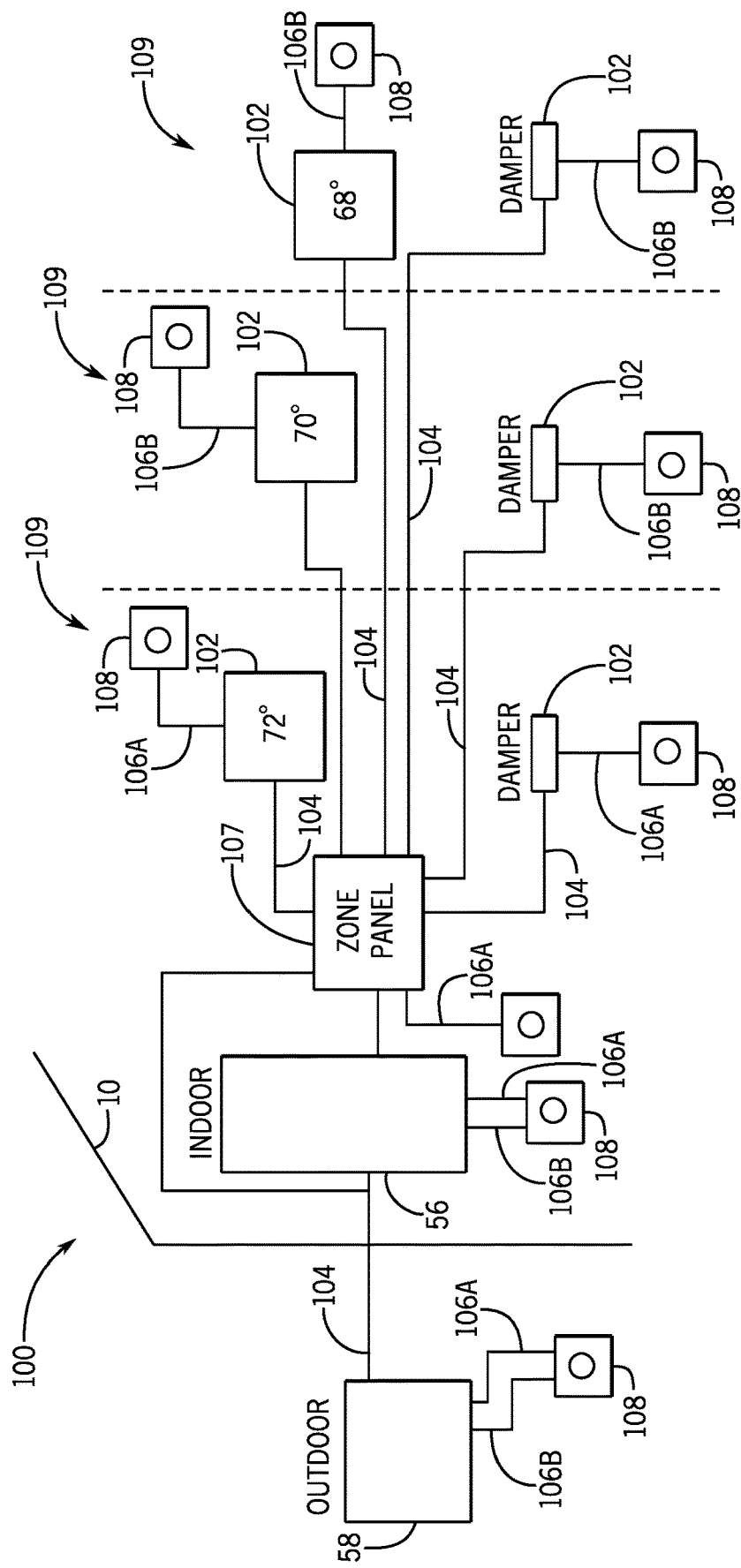
FIG. 6 is a schematic diagram of the HVAC system of FIG. 5 including the one or more devices disposed in multiple zones of the HVAC system and a zone control panel communicatively coupled to the one or more devices via communication buses, in accordance with an embodiment of the present disclosure.

The resources and/or difficulties involved with maintaining the communication buses 104 in an HVAC system 100 may become especially apparent as the number of included devices and/or size of the HVAC system 100 increases. To help illustrate, an HVAC system 100 that includes one or more interface devices 102, such as zone sensors or zone thermostats, in each of multiple zones 109 is shown in FIG. 6. As discussed above with reference to FIG. 5, each of the devices, such as the interface devices 102, the indoor HVAC unit 56, the outdoor HVAC unit 58, and/or the like, in the HVAC system 100 (e.g., zoned HVAC system) may receive power from one or both of a first power line 106A and a second power line 106B. Further, to control airflow to each of the zones 109 independently, the HVAC system 100 may include a zone control panel 107 and may include one or more dampers (e.g., an interface device 102) fluidly coupled between the HVAC equipment and a corresponding zone 109.

The zone control panel 107 may implement a control system of the HVAC system 100 by controlling operation of each of the devices in the HVAC system 100. To do so, the zone control panel 107 may be communicatively coupled to each of the devices in the zoned HVAC system 100 via a communication buses 104. Thus, as illustrated, the HVAC system 100 of FIG. 6 may include an increased number of communication buses 104 in comparison with the HVAC system 100 of FIG. 5, which may result in increased resources and/or time to implement the HVAC system 100 with zones 109.

Figure 7:
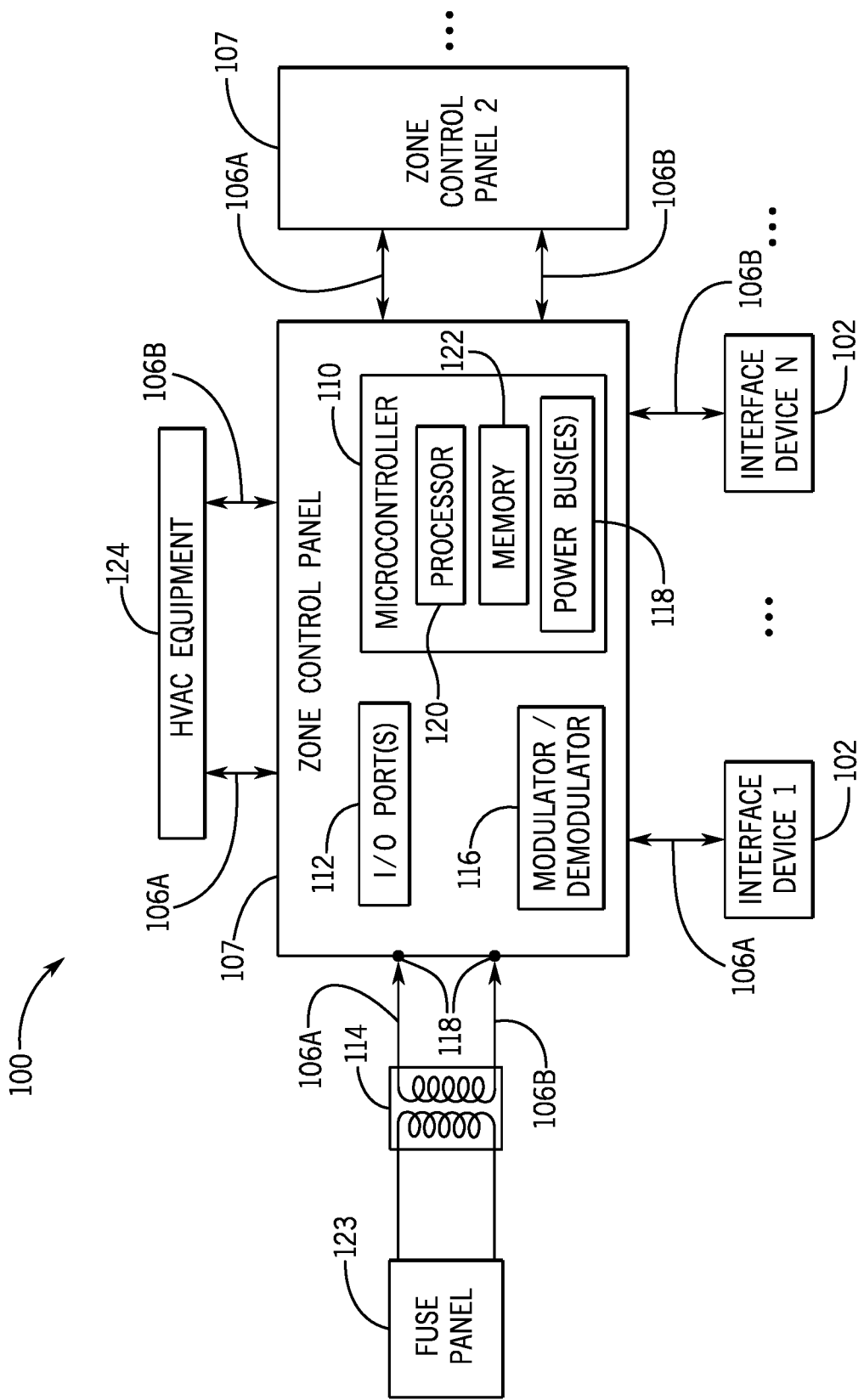
FIG. 7 is a block diagram of a portion of the HVAC system including a zone control panel, in accordance with an embodiment of the present disclosure.

Turning now to FIG. 7, in some embodiments a zone control panel 107 may be implemented in an HVAC system 100 to communicate using power-line communication (PLC), such as narrowband PLC, as described in greater detail below. Additionally, the zone control panel 107 may operate to control operation of devices in the HVAC system 100, for example, by communicating control commands or signals to the devices. To facilitate controlling operation, the zone control panel 107 may include a microcontroller 110, one or more input/output (I/O) ports 112, modulator/demodulator circuitry 116, and one or more power buses 118. In some embodiments, the microcontroller 110 may include a processor 120, such as microprocessor 86, and memory 122, such as non-volatile memory 88, to facilitate controlling operation of the HVAC system.

In some embodiments, the zone control panel 107 may operate using electrical power. Electrical power may be supplied to the HVAC system 100 via a transformer 114, such as an isolation transformer, which may be electrically coupled to, for example, a fuse panel 123 or a power source (not shown). In addition to supplying electrical power, the transformer 114 may filter out noise from incoming power and/or reduce likelihood of signals leaving the HVAC system 100.

In any case, to facilitate controlling operation of a device, the zone control panel 107 may also facilitate conducting electrical power, such as 120 VAC, from the first power line 106A via power buses 118. For example, the zone control panel 107 may receive, via external power buses 118, electrical power from a power source, such as an indoor transformer 114, an outdoor transformer 114, and/or another zone control panel 107, electrically coupled to the first power line 106A. In some embodiments, an external power bus 118 may include one or more off-board connections, which may be provided at the one or more I/O ports 112. Further, the zone control panel 107 may conduct electrical power, such as −120 VAC, from the second power line 106B via the power buses 118. Accordingly, the zone control panel 107 may operate using electrical power received from the first power line 106A, the second power line 106B, or both, for example, to enable the zone control panel 107 to operate using up to 240 VAC. The zone control panel 107 may also route this electrical power between its components, such the microcontroller 110, via internal power buses 118. In some embodiments, an internal power bus 118 may include one or more on-board connections.

Additionally, the zone control panel 107 may route electrical power to HVAC equipment 124, an interface device 102, such as a zone thermostat or sensor, and/or another zone control panel 107 via additional external power buses 118 coupled to its I/O ports 112. More specifically, the zone control panel 107 may route electrical power from the zone control panel 107 (e.g., via the external power bus 118) to a first interface device 102 electrically coupled to the first power line 106A and may route electrical power from the zone control panel 107 to a second interface device 102 electrically coupled to the second power line 106B. Further, the zone control panel 107 may route electrical power from the zone control panel 107 to the HVAC equipment 124, such as the indoor HVAC unit 56 and/or the outdoor HVAC unit 58, and/or to an additional zone control panel 107 electrically coupled to the first power line 106A and to the second power line 106B. In such cases, the HVAC equipment 124 and/or the additional zone control panel 107 may receive electrical power with an increased voltage, such as 240 VAC, compared to that delivered by a single power line 106.

While the illustrated embodiment shows the zone control panel 107 routing electrical power to devices, such as the HVAC equipment 124, the interface devices 102, and the additional zone control panel 107, in some embodiments, the devices may be electrically coupled directly to one or more suitable power lines 106 and/or to the fuse panel 123. That is, for example, a device may be electrically coupled directly to a suitable power line 106 connected to an output of a transformer 114, as illustrated with the zone control panel 107. Additionally or alternatively, as illustrated in FIGS. 5 and 6, a device may be electrically coupled to a power line 106 through an outlet 108. In any case, the illustrated embodiments are intended to be illustrative, and not limiting.

Further, using modulator/de-modulator circuitry 116, the zone control panel 107 may transmit and/or receive a data signal on one or both of the first power line 106A and the second power line 106B. That is, for example, the zone control panel 107 may use power-line communication (PLC) to transmit information over a power line (e.g., 106A and/or 106B) that is simultaneously conducting power, such as the first high-voltage AC power, the second high-voltage AC power, and/or the third high-voltage AC power. To transmit a data signal, the modulator/de-modulator circuitry 116 may modulate or modify an original frequency of the data signal to a first frequency that is different from a second frequency, such as 60 Hz, of the high-voltage AC power transmitted on a power line 106. Additionally or alternatively, the modulator/de-modulator circuitry 116 may modulate or modify an original amplitude of the data signal to a modulated amplitude.

In any case, the modulator/de-modulator circuitry 116 may superimpose the data signal represented in the modulated amplitude and/or the first frequency onto the high-voltage AC power. After superimposing the data signal onto the high-voltage AC power, the modulator/de-modulator circuitry 116 may, using a transmitter and/or a transceiver, transmit the data signal over one or both of the first power line 106A and the second power line 106B. Conversely, after receiving high-voltage AC power transmitted on a power line 106, using, for example, a receiver and/or a transceiver, the modulator/de-modulator circuitry 116 may de-modulate the high-voltage AC power in order to isolate or extract a data signal, if present, received at the zone control panel 107. That is, for example, the modulator/de-modulator circuitry 116 may filter a data signal with the first frequency from the second frequency of the received high-voltage AC power and may then modify the first frequency to the original frequency of the data signal and/or to a frequency suitable for the microcontroller 110 to interpret the information or data indicated via the data signal. Additionally or alternatively, the modulator/de-modulator circuitry 116 may filter the data signal with the modulated amplitude from the high-voltage AC power and may then de-modulate the modulated amplitude to the original amplitude of the data signal and/or to an amplitude suitable for the microcontroller 110 to interpret the information or data indicated via the data signal.

Accordingly, by electrically coupling to a device, such as HVAC equipment 124, an interface device 102, and/or another zone control panel 107, along one or both of the first power line 106A and the second power line 106B, the zone control panel 107 may communicate with and/or control operation of the device according to the techniques described herein. In some embodiments, for example, the microcontroller 110 may determine a control command to instruct HVAC equipment 124, such as a VSD 92, to perform a control action, such as adjust the speed of a motor 94. The microcontroller 110 may then transmit this control command to a digital to analog converter, which converts the control command from a digital signal to an analog electrical signal.

The modulator/de-modulator circuitry 116 may suitably adjust the frequency and/or amplitude of this control command and to enable the control command to be superimposed on high-voltage AC power transmitted along one or both of the first power line 106A and the second power line 106B. To that end, to receive the control command, the electrically coupled device, such as the HVAC equipment 124, may also include modulator/de-modulator circuitry 116 that filters the data signal from received high-voltage AC power and operates accordingly, for example, by converting a control command from an analog electrical signal to a digital signal via an analog to digital converter (ADC).

In some embodiments, the microcontroller 110 may determine the control command based on a user input received at the zone control panel 107, a user input received from an interface device 102, and/or operational parameters, such as speed, temperature, and/or pressure, indicated by the HVAC equipment 124 or a sensor. The zone control panel 107 may receive the input and/or operational parameters from the interface device 102 and/or the HVAC equipment 124, respectively, as a data signal superimposed on the first high-voltage AC power, the second high-voltage AC power, and/or the third high-voltage AC power, according to power-line communication techniques, as discussed herein.

For example, the interface device 102, such as a thermostat, may receive an input to change a temperature setpoint in the HVAC system and/or detect a measured temperature using one or more sensors. In any case, the interface device 102 may use its modulator/de-modulator circuitry 116 to modify the input into a data signal with a frequency and/or amplitude suitable to be superimposed on high-voltage AC power and transmitted over one or both of the first power line 106A and the second power line 106B. The interface device 102 may then transmit the modulated data signal superimposed on high-voltage AC power to the zone control panel 107 over one of the first power line 106A or the second power line 106B. The zone control panel 107 may then de-modulate the received data signal and transmit a control command to the HVAC equipment 124 to adjust the temperature in the HVAC system based on the input and/or the measured temperature in the received data signal.

Further, in some embodiments, the zone control panel 107 may be communicatively coupled to one or more communication buses 104 in the HVAC system. That is, for example, in an HVAC system with existing communication buses 104, the zone control panel 107 may communicate to a device over the communication buses 104 and/or over a power line 106 based in part on the capabilities and/or configuration of the device. Accordingly, in some embodiments, an I/O port 112 on the zone control panel 107 may facilitate communicatively coupling a device to the zone control panel 107 via a communication bus 104. Further, in such embodiments, the zone control panel 107 may be retro-fitted into an existing HVAC system to communicate with installed devices over the communication buses 104, which, at least in some instances, may facilitate reducing resources involved with the installation of new devices in the HVAC system since the zone control panel 107 may nevertheless communicate with the new devices over power lines 106 using power-line communication. As such, a new device, such as an interface device 102, may be integrated into the HVAC system by electrically coupling the interface device 102 to an outlet 108 and/or directly to a power line 106.

Additionally or alternatively, the HVAC system may include multiple zone control panels 107. With multiple zone control panels 107, a primary zone control panel 107 may electrically be coupled to both the first power line 106A and the second power line 106B, while one or more secondary zone control panels 107 may be electrically coupled to one of the first power line 106A or the second power line 106B. Accordingly, in some embodiments, the primary zone control panel 107 may communicate with and/or control operation of any device in the HVAC system electrically coupled to one or both of the first power line 106A and the second power line 106B, while a secondary zone control panel 107 may communicate with and/or control operation of devices electrically coupled to the same power line 106 as the secondary zone control panel 107, or a subset of the devices in the HVAC system. Further, in some embodiments, the primary zone control panel 107 may be communicatively coupled to one or more devices over communication buses 104, as described above, and to a secondary zone control panel 107 over a power line 106. That is, for example, the primary zone control panel 107 may govern communication with devices over the communication buses 104, while the one or more secondary zone control panels 107 may govern communication with devices, including the primary zone control panel 107, over power lines 106.

In any case, because multiple devices may electrically couple to the same power line 106, each device may receive any data signals transmitted or broadcast over power-line communication. Thus, to instruct a specific or targeted device or set of devices to respond to a transmitted data signal, the zone control panel 107 may assign one or more addresses and/or secondary addresses to each device in the HVAC system electrically coupled to a power line 106. The zone control panel 107 may then include an assigned address of a targeted device in the data signal so that targeted device may respond to the data signal. To assign an address to a device, the zone control panel 107 may maintain a mapping, which may be stored in memory 122 and associate each device to a corresponding device identifier, such as a model number, or a primary address.

Further, the zone control panel 107 may communicate the address to the device so that the device may maintain the address in, for example, its own memory, such as non-volatile memory 88. In some embodiments, devices with different device identifier formats may be mapped to a respective address of a set of address, where each address may have the same format. Additionally or alternatively, the device identifier of each device may be stored in memory 122 and used as the address of the respective device. Further, the zone control panel 107 may identify each device as electrically coupled to the first power line 106A, electrically coupled to the second power line 106B, or electrically coupled to both the first power line 106A and the second power line 106B with, for example, a secondary address. In any case, the zone control panel 107 may update the mapping of addresses to device identifiers and/or the identification of each device as electrically coupled to one or both of the first power line 106A or the second power line 106B based on changes in configuration of the HVAC system, such as the devices included and/or their locations within the HVAC system.

Figure 8:
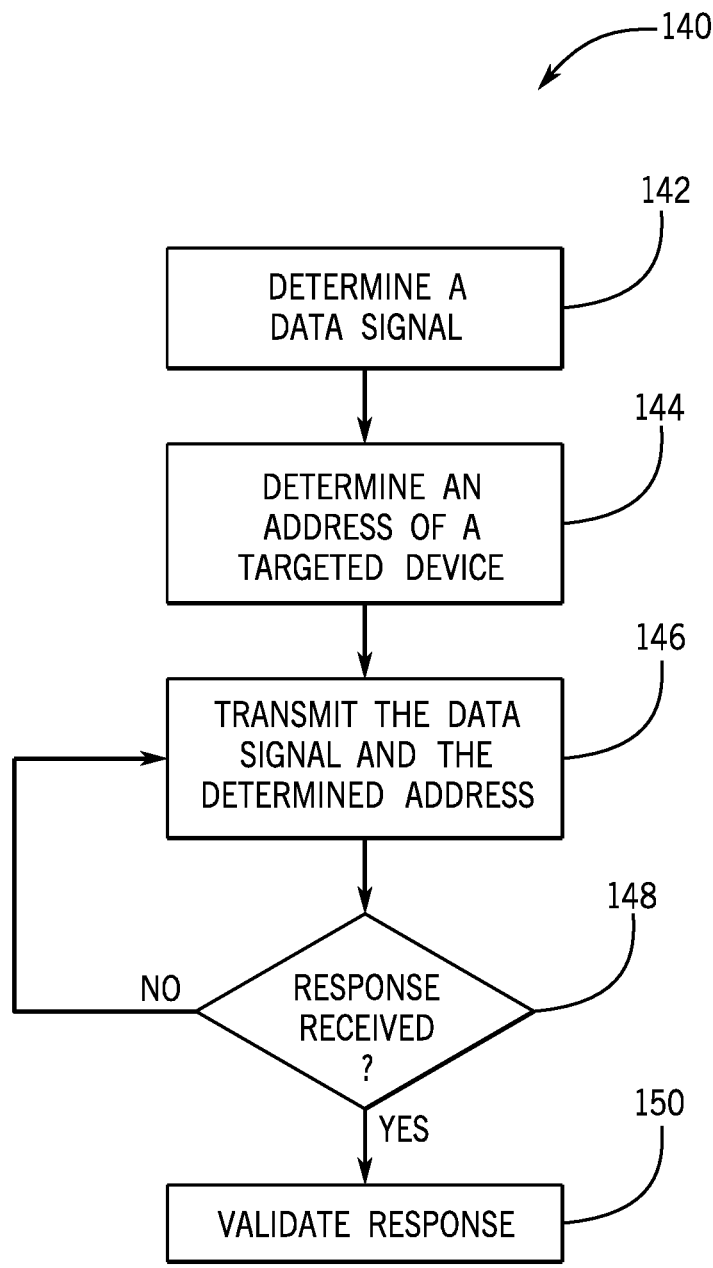
FIG. 8 is a flow diagram of a process for transmitting from and/or receiving information at the zone control panel of FIG. 7, in accordance with an embodiment of the present disclosure.

In any case, an example of a process 140 for suitably transmitting from and/or receiving information at a zone control panel 107 via power line communication is described in FIG. 8. Generally, the process 140 includes determining a data signal (process block 142), determining an address of a device targeted to receive the data signal (process block 144), transmitting the data signal and the determined address (process block 146), determining whether a response has been received (decision block 148), if a response has been received from the targeted device, validating the response (process block 150), and if a response has not been received from the targeted device after a set period of time, re-transmitting the data signal and the determined address (process block 146).

Although the following description of the process 140 is described in a particular order, which represents a particular embodiment, it should be noted that the process 140 may be performed in any suitable order. Additionally, embodiments of the process 140 may omit process blocks and/or include suitable additional process blocks. Moreover, in some embodiments, the process 140 may be implemented at least in part by executing instructions stored in a tangible, non-transitory, computer-readable medium, such as memory 122, using processing circuitry, such as processor 120.

Accordingly, in some embodiments, a microcontroller 110 of the zone control panel 107 may determine one or more data signals (process block 142). In some embodiments, a data signal may indicate a control command targeted at one or more other devices in the HVAC system. Thus, as described above, the microcontroller 110 may use information and/or a received input to determine a demand for a change in one or more conditions in the HVAC system, such as temperature, airflow, and/or the like, and may determine a control command to control operation of a targeted device, such as the HVAC equipment 124, to produce the change in the one or more conditions. The microcontroller 110 may further determine the data signal and/or the format of the data signal based at least in part on a transmission protocol, such as RS-232 and/or RS-585.

To facilitate communicating the data signal to an appropriate device, the microcontroller 110 may determine the address of the device targeted to receive the data signal (process block 144). In some embodiments, the microcontroller 110 may determine the address based at least in part on a mapping between a device identifier of the targeted device and its address. Thus, in such embodiments, the microcontroller 110 may retrieve and/or access the mapping from where it is stored, for example, in memory 122. Further, in some embodiments, to simultaneously instruct a group of two or more devices with the same control command, the microcontroller 110 may determine a respective address for each of the targeted devices in the group based on their respective mappings. Additionally or alternatively, the microcontroller 110 may determine a single address, such as a secondary address, mapped to each of the targeted devices in the group.

After determining the address of the device targeted to receive the data signal, the zone control panel 107 may output the data signal and the determined address (process block 146). More specifically, in some embodiments, the zone control panel 107 may append and/or prepend the determined address to the data signal to create a data message. Additionally, in some embodiments, a digital to analog converter (DAC) may convert the date message from a digital signal to an analog electrical signal.

The zone control panel 107 may then use the modulator/de-modulator circuitry 116 to modulate the frequency and/or amplitude of the data message so that it is suitable to superimpose on high-voltage AC power, according to power-line communication techniques. The modulator/de-modulator circuitry 116 may then superimpose the data message on one or both of the first power line 106A or the second power line 106B. In some embodiments, the zone control panel 107 may transmit the data message on one or both of the first power line 106A and the second power line 106B based on the mapping, which may be stored in memory 122, of the device to the power line(s) 106 it is electrically coupled to. That is, for example, in addition to determining the address of the targeted device, the zone control panel 107 may determine whether the device is electrically coupled to one or both of the first power line 106A or the second power line 106B. Further, in some embodiments, the zone control panel 107 may send the data signal to a first address of a first device electrically coupled to the first power line 106A while simultaneously sending the data signal to a second address of a second device electrically coupled to the second power line 106B. In any case, to transmit the superimposed data message on any of the power lines 106, the zone control panel 107 may use a serial protocol, such as RS-232 or RS-585, which may govern the timing of the transmission of the data message.

Further, by transmitting the data message over a power line 106, any device electrically coupled to the power line 106 may receive the data message. That is, for example, the zone control panel 107 may broadcast the data message to each of the devices electrically coupled to the one or more power lines 106 used to transmit the data message. In this manner, as described above, a device coupled to the power line 106 may extract the data message and operate accordingly.

Figure 9:
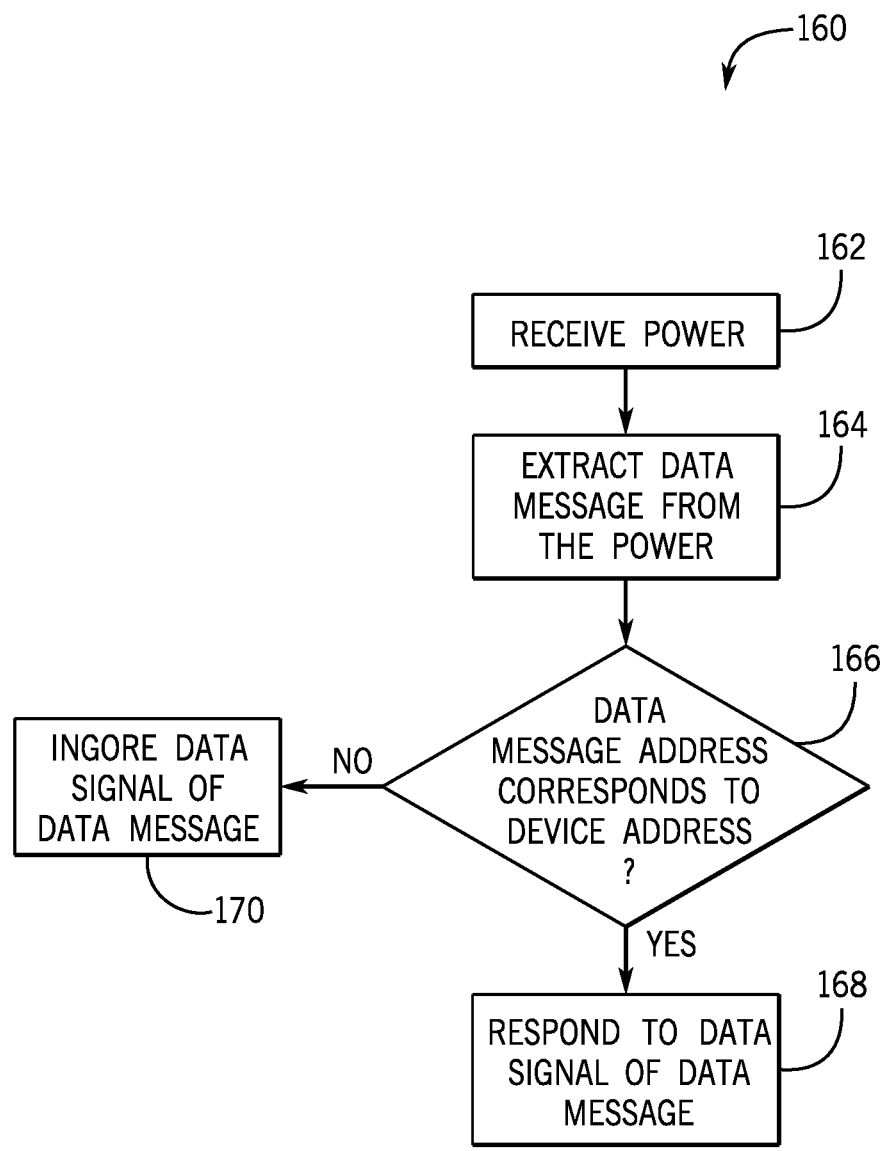
FIG. 9 is flow diagram of a process for receiving information at and/or transmitting information from a device of the HVAC system, in accordance with an embodiment of the present disclosure.

To help illustrate, an example of a process 160 for receiving information from the zone control panel 107 at a device and/or transmitting information to the zone control panel 107 from the device via power line communication is described in FIG. 9. Generally, the process 160 includes receiving high-voltage AC power (process block 162), extracting a data message from the high-voltage AC power (process block 164), determining whether the address received in the data message corresponds to an address of the device (decision block 166), when the received address corresponds to the address of the device, responding to the data signal in the data message (process block 168), and when the received address fails to correspond to the address of the device, ignoring the data signal in the data message (process block 170).

Although the following description of the process 160 is described in a particular order, which represents a particular embodiment, it should be noted that the process 160 may be performed in any suitable order. Additionally, embodiments of the process 160 may omit process blocks and/or include suitable additional process blocks. Moreover, in some embodiments, the process 160 may be implemented at least in part by executing instructions stored in a tangible, non-transitory, computer-readable medium, such as memory 122, using processing circuitry, such as processor 120.

In any case, to receive high-voltage AC power, a device, such as an interface device 102, HVAC equipment 124, or another zone control panel 107, may be electrically coupled to one or both of the first power line 106A or the second power line 106B (process block 162). As such, the device may receive the first high-voltage AC power, the second high-voltage AC power, or the third high-voltage AC power delivered by the first power line 106A, the second power line 106B, or the combination of the first power line 106A and the second power line 106B, respectively. Further, to receive the high-voltage AC power, the device and/or its components may be implemented to operate using the received high-voltage AC power.

After receiving the high-voltage AC power, the device may extract a data message, if present, from the high-voltage AC power (process block 164). To do so, the high-voltage AC power may be routed to modulator/de-modulator circuitry 116 in the device. The modulator/de-modulator circuitry 116, as described with reference to the zone control panel 107 above, may filter out the data message from the high-voltage AC power, for example, based on difference between the frequency and/or amplitude of the data message and the frequency and/or amplitude of the high-voltage AC power. After filtering out the data message, the modulator/de-modulator circuitry 116 may adjust the frequency of the data message, for example, to a frequency suitable for the device to process the information in the data message. Additionally or alternatively, the modulator/de-modulator circuitry 116 may adjust the amplitude of the data message, for example, to an amplitude suitable for the device to process the information in the data message. Further, in some embodiments, the data message may be converted from an analog electrical signal to a digital signal via an analog to digital converter (ADC).

The device may then determine whether the address received in the data message corresponds to the address of the device (decision block 166). That is, for example, the device may include an address, which may be assigned to the device by the zone control panel 107 and may be stored in memory, such as non-volatile memory 88. Thus, the device may compare its address to the address received in the data message, which may be prepended and/or appended to the data signal included in the data message. Further, the device may interpret or decode the address included in the data message according to the serial transmission protocol used by the zone control panel 107 to construct and/or transmit the data message.

In any case, if the received address corresponds to the device address, the device may interpret and respond to the data signal included in the data message (process block 168). As described above with reference to the received address, the data signal and/or a control command included in the data signal may be interpreted according to the serial transmission protocol used to send and/or receive the data message. Further, the device may detect and/or correct an error in the data message received on both the first power line 106A and the second power line 106B by comparing a copy (e.g., instance) of the data message received on the first power line 106A to a copy of the data message received on the second power line 106B. Additionally or alternatively, the device may detect and/or correct an error in the data message by verifying a checksum and/or a cyclic redundancy check (CRC) in the data message.

In any case, a suitable response to the data signal may include adjusting the operation of the device according to the control command. That is, for example, HVAC equipment 124 may condition air according to a new setting, such as a temperature setpoint, based on the control command. Additionally or alternatively, the device may transmit a response, which may include requested information, such as a measurement from a sensor, and/or an acknowledgement that the data message was received and/or acted upon, to the received data message. Further, as the power lines 106 may facilitate half-duplex communication, the device may transmit the response within a set period of time to reduce interference with other data message transmitted on the power lines 106.

If, on the other hand, the received address does not correspond to the device address, the device may ignore the data signal (process block 170). Because a data message transmitted by the zone control panel 107 over one or both of the first power line 106A or the second power line 106B may be received at each device electrically coupled to the respective power lines 106, the address in the data message may be used to indicate which of the devices that received the data message are targeted by the data signal. Accordingly, a device with an address that does not correspond to the received address may continue operating as though the data message was not received. That is, for example, the device may not alter its operation in response to a data message with an address that does not correspond to the device's address. However, in such cases, the device may continue to receive suitable high-voltage AC power, regardless of whether a data message transmitted on a power line 106 used to conduct this power is relevant to the device.

Returning to the process 140 of FIG. 8, as described with reference to process block 168, a targeted device may respond to a received data signal. Accordingly, in some embodiments, the zone control panel 107 may determine whether a response was received from the targeted device (decision block 148). In some embodiments, serial transmission of a data message over a power line 106 may involve half-duplex data transmission. That is, for example, a data message may be transmitted in a single direction, such as from the zone control panel 107 to a device or from the device to the zone control panel 107, at a time. As such, after serially transmitting the data message (process block 146), the zone control panel 107 may wait a set period of time or duration.

During this set period of time, the zone control panel 107 may restrict any additional transmission of a data signal so that a suitable power line 106 may be available to transmit data from the targeted device back to the zone control panel 107. Accordingly, during this set period of time, the zone control panel 107 may, at the modulator/de-modulator circuitry 116, filter the high-voltage AC power of one or both of the first power line 106A or the second power line 106B for a data message.

In some embodiments, if the zone control panel 107 has determined that the targeted device is electrically coupled to the first power line 106A, the zone control panel 107 may filter the high-voltage AC power of the first power line 106A, while the zone control panel 107 may filter the high-voltage AC power of the second power line 106B for the data message if the targeted device is electrically coupled to the second power line 106B. Further, in some embodiments if the zone control panel 107 has determined that a first target device is electrically coupled to the first power line 106A and that a second target device is electrically coupled to the second power line 106B, the zone control panel 107 may filter the respective high-voltage power of each of the first power line 106A and the second power line 106B. For a targeted device electrically coupled to both the first power line 106A and the second power line 106B, the zone control panel 107 may filter one or both of the first power line 106A and the second power line 106B, as the targeted device may transmit the response on one or both of the first power line 106A or the second power line 106B. In some embodiments, as described below, filtering both the first power line 106A and the second power line 106B may provide redundancy that facilitates error detection and/or correction.

If, after the set period of time, the zone control panel 107 has not received a data message, the zone control panel 107 may re-transmit the data message (process block 148). On the other hand, if the zone control panel 107 receives a response data message during the set period of time, the zone control panel 107 may proceed to validate or verify the response message (process block 150). To do so, in some embodiments, the zone control panel 107 may filter and de-modulate the received response message at the modulator/de-modulator circuitry 116 to isolate the response message and to adjust the frequency and/or amplitude of the response message to a frequency and/or amplitude suitable for the zone control panel 107 to interpret the response message.

The zone control panel 107 may then interpret the response message and/or a data signal included in the response message according to the serial transmission protocol. Further, the zone control panel 107 may verify a checksum and/or a cyclic redundancy check (CRC) to ensure that the information included in the data signal is correct and/or has not been corrupted. Accordingly, the zone control panel 107 may compare the received checksum and/or CRC to an expected checksum or an expected CRC, respectively. In this manner, based on the checksum and/or the CRC, the zone control panel 107 may detect and/or correct a data error present in the data signal.

Further, in some embodiments, to validate or verify the response message, the zone control panel 107 may compare a response message received on the first power line 106A to a response message received on the second power line 106B. In some cases, for example, the zone control panel 107 may detect and/or correct an error in a response message received from a device electrically coupled to the first power line 106A and the second power line 106B by comparing a copy of the response message received on the first power line 106A to a copy of the response message received on the second power line 106B.

Figure 10:
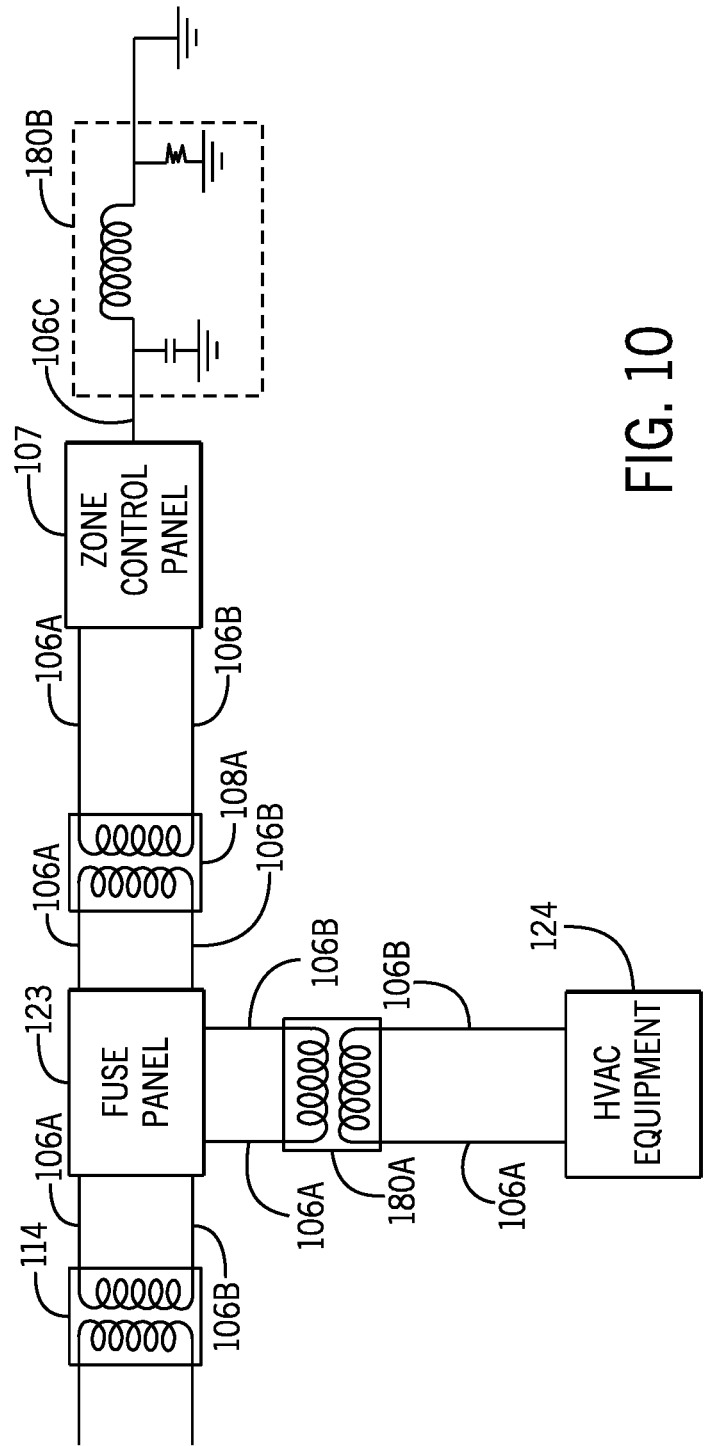
FIG. 10 is a block diagram of a portion of the HVAC system including a filter, in accordance with an embodiment of the present disclosure.

Turning now to FIG. 10, in some embodiments, data messages transmitted over a power line 106, according to the techniques described herein, may be susceptible to noise. Accordingly, in addition or as an alternative to the transformer 114 of FIG. 7, the HVAC system may include one or more filters 180, such as a first 180A and/or a second 180B. In some embodiments, a first filter 180A may remove noise on one or both of the first power line 106A and the second power line 106B before high-voltage AC power is delivered to a device, such as HVAC equipment 124. As such, a device may electrically couple to one or both of the first power line 106A and the second power line 106B by electrically coupling to the filter 180A. The filter 108A may also prevent and/or reduce signal transmission beyond the HVAC system (e.g., outside the building 10). Further, by filtering the power lines 106, external signals may be blocked and/or prevented from interfering with and/or accessing the data messages within the HVAC system.

Additionally or alternatively, a filter 180B may filter the bonded neutrals of the HVAC system. In such embodiments, a neutral power line 106C, which may electrically couple to the zone control panel 107 and/or a device, bonded or electrically coupled to system ground may be connected in series with the filter 180B, which may be electrically coupled to earth ground. This configuration, as illustrated in FIG. 10, may shunt filtered electrical signals on the neutral power line 106C to ground and not back to the grid. Accordingly, data messages may be maintained within the HVAC system and outside interference with communication over the power lines 106 may be prevented or reduced.

Further, while the process 140 and the process 160 are described as facilitating communication between the zone control panel 107 and a device, such as HVAC equipment 124, an interface device 102, and/or an additional zone control panel 107, the process 140 and/or the process 160 may additionally or alternatively be implemented to facilitate communication between two or more devices. That is, for example, HVAC equipment 124 and an interface device 102 may communicate directly with one another. Accordingly, an interface device 102 may instruct a sensor to provide a measurement, and/or HVAC equipment 124, such as indoor HVAC unit 56, may instruct additional HVAC equipment 124, such as outdoor HVAC unit 58, to alter its operation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A heating, ventilation, and air conditioning (HVAC) system comprising:
   a first device configured to be electrically coupled to either a first power line that conducts a first phase of electrical power, a second power line that conducts a second phase of electrical power, or both; and
   a zone control panel configured to be electrically coupled to the first power line and the second power line, wherein the zone control panel comprises modulator circuitry, de-modulator circuitry, and a microcontroller programmed to, when a first control command is to be communicated to the first device to instruct the first device to adjust operation:
      determine an address mapping that associates each of a plurality of devices implemented in the HVAC system to a corresponding primary address and a corresponding secondary address, wherein a primary address is used to identify a corresponding device and a secondary address indicates one or more power lines to which the corresponding device is electrically coupled;

determine a first primary address and a first secondary address associated with the first device based at least in part on the address mapping;

generate a first data message that indicates the first control command and the first primary address associated with the first device; and instruct the modulator circuitry to modulate voltage of the first phase of electrical power conducted by the first power line based on the first data message to enable supplying the first control command to the first device along with the first phase of electrical power when the first secondary address indicates that the first device is electrically coupled to the first power line;

wherein the microcontroller is programmed to instruct the de-modulator circuitry to determine a second data message output from the first device by:

filtering a superimposed modulated data message received from the first device via the first power line to extract a modulated data message from the superimposed modulated data message based at least in part on frequency of the first phase of electrical power, frequency of the modulated data message, amplitude of the first phase of electrical power, amplitude of the modulated data message, or any combination thereof; and de-modulating amplitude, frequency, or both of the modulated data message to produce the second data message; and wherein the microcontroller is programmed to:

determine whether the second data message is received within a threshold duration after instructing the modulator circuitry to modulate the voltage of the first phase of electrical power; and instruct the modulator circuitry to modulate voltage of the first phase of electrical power conducted by the first power line based on the first data message to enable re-supplying the first control command to the first device along with the first phase of electrical power when the second data message is not received within the threshold duration.

2. The HVAC system of claim 1, wherein the modulator circuitry is configured to:

receive a digital signal from the microcontroller that indicates the first data message;

generate a first modulated data message by modulating amplitude, frequency, or both of a first voltage signal based at least in part on the digital signal; and output the first modulated data message via the first power line to superimpose the first modulated data message on the first phase of electrical power when the first secondary address indicates that the first device is electrically coupled to the first power line.

3. The HVAC system of claim 1, wherein the microcontroller is programmed to:

instruct the modulator circuitry to modulate voltage of the second phase of electrical power conducted by the second power line based on the first data message to enable supplying the first control command to the first device along with the second phase of electrical power when the first secondary address indicates that the first device is electrically coupled to the second power line.

4. The HVAC system of claim 1, wherein the microcontroller is programmed to:

instruct the modulator circuitry to modulate the voltage of the first phase of electrical power conducted by the first power line and voltage of the second phase of electrical power conducted by the second power line based on the first data message to enable supplying the first control command to the first device along with both the first phase of electrical power and the second phase of electrical power when the first secondary address indicates that the first device is electrically coupled to both the first power line and the second power line.

5. The HVAC system of claim 4, wherein, in response to the microcontroller instructing the modulator circuitry to modulate the voltage of the first phase of electrical power conducted by the first power line and the voltage of the second phase of electrical power conducted by the second power line, the first device is programmed to:

receive a first instance of the first data message on the first power line;

receive a second instance of the first data message on the second power line; and perform error detection of the first data message based on a comparison of the first instance of the first data message and the second instance of the first data message.

6. The HVAC system of claim 1, wherein the microcontroller is programmed to:

instruct the modulator circuitry to modulate the voltage of the first phase of electrical power conducted by the first power line based on the first data message to enable supplying the first control command to the first device along with the first phase of electrical power when the first secondary address indicates that the first device is electrically coupled to both the first power line and the second power line.

7. The HVAC system of claim 1, wherein the microcontroller is programmed to:

instruct the modulator circuitry to modulate the voltage of the second phase of electrical power conducted by the second power line based on the first data message to enable supplying the first control command to the first device along with the second phase of electrical power when the first secondary address indicates that the first device is electrically coupled to both the first power line and the second power line.

8. The HVAC system of claim 1, further comprising a second device configured to be electrically coupled to either the first power line, the second power line, or both, wherein the microcontroller is programmed to, when a second control command is to be communicated to the second device to instruct the second device to adjust operation:

determine the address mapping;

determine a second primary address and a second secondary address associated with the second device based at least in part on the address mapping;

generate a second data message that indicates the second control command and the second primary address associated with the second device; and instruct the modulator circuitry to modulate voltage of the second phase of electrical power conducted by the second power line based on the second data message to enable supplying the second control command to the second device along with the second phase of electrical power when the second secondary address indicates that the second device is electrically coupled to the second power line.

9. The HVAC system of claim 8, wherein:

the first phase of electrical power comprises 120 volt alternating current electrical power;

the second phase of electrical power comprises 120 volt alternating current electrical power;

the zone control panel is configured to operate using 240 volt alternating current electrical power;

the first device is configured to operate using 240 volt alternating current electrical power; and the second device is configured to operate using 120 volt alternating current electrical power.

10. The HVAC system of claim 1, comprising a third device communicatively coupled to the zone control panel via a communication bus, wherein the microcontroller is programmed to communicate a second control command to the third device via the communication bus.

11. The HVAC system of claim 1, comprising:

a neutral power line configured to conduct neutral electrical power, wherein the first device, the zone control panel, or both are electrically coupled to the neutral power line; and a filter electrically coupled to the neutral power line, wherein the filter is configured to filter noise from the neutral electrical power and to shunt the noise to ground.

12. A method for controlling operation of a heating, ventilation, and air conditioning (HVAC) system, comprising:

determining, using a controller in the HVAC system, an address mapping that associates each of a plurality of devices implemented in the HVAC system to a corresponding primary address and a corresponding secondary address, wherein a primary address is used to identify a corresponding device and a secondary address indicates one or more power lines to which the corresponding device is electrically coupled;

determining, using the controller, a first primary address and a first secondary address associated with a first device based at least in part on the address mapping, wherein the first device is configured to be electrically coupled to either a first power line that conducts a first phase of electrical power, a second power line that conducts a second phase of electrical power, or both;

generating, using the controller, a first data message that indicates a first control command and the first primary address associated with the first device, wherein the first control command is to be communicated to the first device to instruct the device to adjust operation;

instructing, using the controller, modulator circuitry in the HVAC system to modulate voltage of the first phase of electrical power conducted by the first power line based on the first data message to enable supplying the first control command to the first device along with the first phase of electrical power when the first secondary address indicates that the first device is electrically coupled to the first power line;

instructing, using the controller, de-modulator circuitry in the HVAC system to filter a superimposed modulated data message received from the first device via the first power line to extract a modulated data message from the superimposed modulated data message based at least in part on frequency of the first phase of electrical power, frequency of the modulated data message, amplitude of the first phase of electrical power, amplitude of the modulated data message, or any combination thereof;

de-modulating, using the de-modulator circuitry, amplitude, frequency, or both of the modulated data message to produce a second data message;

determining, using the controller, that the second data message is not received within a threshold duration after instructing the modulator circuitry to modulate the voltage of the first phase of electrical power; and instructing, using the controller, the modulator circuitry to modulate voltage of the first phase of electrical power conducted by the first power line based on the first data message to enable re-supplying the first control command to the first device along with the first phase of electrical power based on the second data message not being received within the threshold duration.

13. The method of claim 12, comprising, at the first device, in response to receiving the first data message from the first power line:

determining that the first primary address indicated by the first data message is associated with the first device; and adjusting the operation of the first device based at least in part on the first control command indicated by the first data message.

14. The method of claim 12, comprising:

receiving, at a second device in the HVAC system, the first data message, wherein the second device is configured to be electrically coupled to the first power line; and in response to receiving the first data message, determining, at the second device, that the first primary address indicated by the first data message is not associated with the second device.

15. A tangible, non-transitory, computer-readable medium, comprising instructions executable by one or more processors implemented in a heating, ventilation, and air conditioning (HVAC) system that, when executed, cause the one or more processors to:

determine an address mapping that associates each of a plurality of devices implemented in the HVAC system to a corresponding primary address and a corresponding secondary address, wherein a primary address is used to identify a corresponding device and a secondary address indicates one or more power lines to which the corresponding device is electrically coupled;

determine a first primary address and a first secondary address associated with a first device in the HVAC system based at least in part on the address mapping, wherein the first device is configured to be electrically coupled to either a first power line that conducts a first phase of electrical power, a second power line that conducts a second phase of electrical power, or both;

generate a first data message that indicates a first control command and the first primary address associated with the first device, wherein the first control command is to be communicated to the first device to instruct the device to adjust operation;

instruct modulator circuitry in the HVAC system to modulate voltage of the first phase of electrical power conducted by the first power line based on the first data message to enable supplying the first control command to the first device along with the first phase of electrical power when the first secondary address indicates that the first device is electrically coupled to the first power line;

instructing de-modulator circuitry in the HVAC system to filter a superimposed modulated data message received from the first device via the first power line to extract a modulated data message from the superimposed modulated data message based at least in part on frequency of the first phase of electrical power, frequency of the modulated data message, amplitude of the first phase of electrical power, amplitude of the modulated data message, or any combination thereof;

de-modulating, using the de-modulator circuitry, amplitude, frequency, or both of the modulated data message to produce a second data message;

determining whether the second data message is received within a threshold duration after instructing the modulator circuitry to modulate the voltage of the first phase of electrical power; and instructing the modulator circuitry to modulate voltage of the first phase of electrical power conducted by the first power line based on the first data message to enable re-supplying the first control command to the first device along with the first phase of electrical power when the second data message is not received within the threshold duration.

16. The computer-readable medium of claim 15, wherein the instructions, when executed, cause the one or more processors to, in response to instructing the modulator circuitry to transmit the first data message to the first device:

determine that a response has been received at the one or more processors within a duration, wherein the response comprises a third data message transmitted on the first power line or both of the first power line and the second power line; and compare one or both of a checksum or a cyclic redundancy check respectively to an expected checksum or an expected cyclic redundancy check.

17. The computer-readable medium of claim 15, wherein the instructions to instruct the HVAC system to generate the first data message comprise instructions that, when executed, cause the one or more processors to:

generate a digital signal that indicates the first data message; and instruct a digital to analog converter to convert the first data message from the digital signal to an analog electrical signal.

18. The computer-readable medium of claim 15, wherein the instructions, when executed, cause the one or more processors to instruct the modulator circuitry to modulate the voltage of the first phase of electrical power conducted by the first power line based on the first data message and a serial transmission protocol.

19. A heating, ventilation, and air conditioning (HVAC) system comprising:

a first device configured to be electrically coupled to either a first power line that conducts a first phase of electrical power, a second power line that conducts a second phase of electrical power, or both; and a zone control panel configured to be electrically coupled to the first power line and the second power line, wherein the zone control panel comprises modulator circuitry, and a microcontroller programmed to, when a first control command is to be communicated to the first device to instruct the first device to adjust operation:

determine an address mapping that associates each of a plurality of devices implemented in the HVAC system to a corresponding primary address and a corresponding secondary address, wherein a primary address is used to identify a corresponding device and a secondary address indicates one or more power lines to which the corresponding device is electrically coupled;

determine a first primary address and a first secondary address associated with the first device based at least in part on the address mapping;

generate a first data message that indicates the first control command and the first primary address associated with the first device;

instruct the modulator circuitry to modulate voltage of the first phase of electrical power conducted by the first power line based on the first data message to enable supplying the first control command to the first device along with the first phase of electrical power when the first secondary address indicates that the first device is electrically coupled to the first power line;

instruct the modulator circuitry to modulate the voltage of the first phase of electrical power conducted by the first power line and voltage of the second phase of electrical power conducted by the second power line based on the first data message to enable supplying the first control command to the first device along with both the first phase of electrical power and the second phase of electrical power when the first secondary address indicates that the first device is electrically coupled to both the first power line and the second power line; and wherein, in response to the microcontroller instructing the modulator circuitry to modulate the voltage of the first phase of electrical power conducted by the first power line and the voltage of the second phase of electrical power conducted by the second power line, the first device is programmed to:

receive a first instance of the first data message on the first power line;

receive a second instance of the first data message on the second power line; and perform error detection of the first data message based on a comparison of the first instance of the first data message and the second instance of the first data message.

\* \* \* \* \*